United States Patent Office.

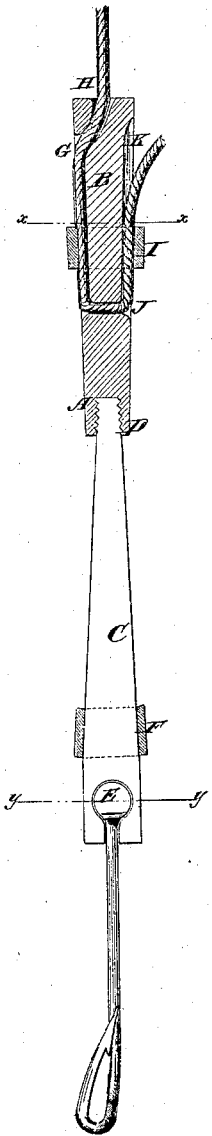

LEVI ARNOLD, OF BELCHERTOWN, MASSACHUSETTS.

Letters Patent No. 111,898, dated February 21, 1871.

IMPROVEMENT IN FISH-HOOKS.

The Schedule referred to in these Letters Patent and making part of the same.

*To all whom it may concern:*

Be it known that I, LEVI ARNOLD, of Belchertown, in the county of Hampshire and State of Massachusetts, have invented a new and useful Improvement in Fish-Hook and Line-Holder; and I do hereby declare that the following is a full, clear, and exact description thereof, which will enable others skilled in the art to make and use the same, reference being had to the accompanying drawing forming part of this specification.

The object of this invention is to furnish an effective and convenient device to which to attach the line of fishing-tackle, and, at the same time, provide a sinker; and It consists in a metallic block or piece, provided with suitable perforations for passing the line through it, and with sliding rings for securing the line, as will be hereinafter fully described.

In the accompanying drawing—

Figure 1 represents a longitudinal central section of the improvement, showing the hook and the line attached thereto.

Figure 2 is a cross-section of fig. 1 on the line x x.

Figure 3 is a cross-section of fig. 1 on the line y y.

Similar letters of reference indicate corresponding parts.

A is the metallic connection or rod, which is provided with a screw-threaded socket in the lower end to receive the part C, which is made in two longitudinal sections, with a cavity for receiving the head of the hook, as seen at E.

F is a ring or band which slides over both sections, and the part C thus formed being tapering, as seen, the sections will be tightly closed together over the head of the hook when the ring F is slipped down, as represented.

The part A, marked B in its upper section, is a solid piece, with a groove, G, on one of the sides, access to which groove is obtained by a hole, H, in the end, through which the line is passed.

I is a band or ring which slides on the part B.

J is a hole which passes through B.

The line is inserted at H into the groove G, and through the hole J into the other groove K when the ring I is below the hole. The ring is now slipped up over the line in the grooves, which makes the fastening complete.

By this metallic connection A the hook and the line are connected or fastened in the most secure manner, while either may be detached readily.

The connection A forms a sinker for deep-water fishing, and prevents the line from being reached by the teeth of the fish.

This invention leaves nothing to be desired by the sportsman as far as it relates to fishing-tackle.

Having thus described my invention,

I claim as new and desire to secure by Letters Patent—

The metallic block or piece A B, provided with perforations to receive the line, and with a sliding ring for securing it, substantially as shown and described.

The above specification of my invention signed by me this 8th day of November, 1870.

LEVI ARNOLD.

Witnesses:
GEO. W. MABEE,
L. S. MABEE.